Patented Apr. 18, 1939

2,154,988

UNITED STATES PATENT OFFICE 2,154,988

METHOD OF REFINING CRACKED OIL BY USING METALLIC SOAPS

Masakichi Mizuta, Marunouchi, Kojimachi-ku, Tokyo, and Teiji Yoshimura, Okubo, Kashiwazaki-Machi, Kariha-gun, Niigata-ken, Japan, assignors to Nippon Sekiyu Kabushiki Kaisha, Tokyo, Japan, a corporation of Japan No Drawing. Original application August 11, 1934, Serial No. 739,500. Divided and this application April 13, 1937, Serial No. 136,686

1 Claim. (Cl. 196—30)

The present invention is a division of our copending application Serial No. 739,500, filed August 11, 1934, and relates to a method of refining cracked oil, by adding to cracked oil at or below the ordinary temperature one or more of copper, lead, zinc and iron salts of fatty acids in solid state, or dissolved in gasoline, petroleum, benzol, toluol, xylols, or turpentine, or in a mixture of two or more of said solvents, whereby not only all the offensive odor compounds and other impurities contained in the cracked oil will be combined with the metal or metals in dissolved state and be precipitated as insoluble salts containing the offensive odor compounds, but also even the disagreeable odor compounds which react only with great difficulty be adsorbed and precipitated at the same time.

The object thereof is to bring all of principal offensive odor substances such as thioalcohols contained in cracked oil into intimate contact at a comparatively low temperature with metallic salts of organic acids soluble in cracked oil, whereby same will react upon each other directly by double decomposition and be precipitated as insoluble salts, and at the same time to produce compounds, which react only with difficulty with ordinary refining agents, such as for instance disulphides, deposited by the astringent and adsorptive actions of these insoluble salts at the moment of their formation, thus removing all substances which cause disagreeable odor completely from the cracked oil without involving any operation which would be detrimental to volatile oil, such as agitation, stirring, etc.

This invention relates to a method of refining the cracked oil produced by cracking processes of petroleum oils, tars manufactured from coal and shale, and other organic matters and is adapted mainly for removing completely the offensive odor substances contained in cracked oil while at the same time increasing the stability of the product.

The offensive odor substances in cracked oil are chiefly di-sulphides, unsaturated organic compounds, and thioalcohols, particularly the low boiling thioalcohols. These substances even in the slightest quantity give an offensive odor to volatile oil. For instance, ethyl thioalcohol will give a disagreeable odor to gasoline even when in concentrations of $1/10,000$ or $1/100,000$ by weight.

Thioalcohol gives an offensive smell which decreases with an increase in its molecular weight, but even the crystallizable higher members of thioalcohols give a bad odor, and thioalcohols have a tendency to reduce their reactive powers gradually with an increase in molecular weight.

In cracked oil, the quantity of disulphide originally present is only very small, but as most of same is produced by the oxidation of the thioalcohols, its quantity consequently increases gradually with lapse of time after the manufacture of the cracked oil. This compound also gives a burning odor to cracked oil. It reacts only with extreme difficulty with ordinary refining agents for cracked oil, and consequently the disulphide is difficult to remove therefrom.

Some unsaturated organic compounds in cracked oil are very unstable. If isolated, they will for the most part polymerize at once, but if diluted with gasoline, same will become comparatively more stable. Such compounds give a disagreeable odor to cracked oil by their oxidation products. However, they may be removed easily by treatment with sulphuric acid.

Now, according to the present method which is the result of the study of the constituents and properties of many such disagreeable odor substances, same may be removed completely.

The known methods all employ refining agents insoluble in the matter to be purified, so that even by violent agitation it is difficult to cause intimate contact of a refining agent with the matter to be purified the difficulty rising when the differences in specific gravity increases. Therefore, only a portion, but not the whole, of these disagreeable odor substances are removed and complete removal of said substances cannot be realized. In refining operations, the oxidation of thioalcohols in accelerated with the violence of agitation in the atmosphere, and therefore such agitation not only causes the thioalcohols to remain as disulphides, but also causes loss of gasoline due to volatilization, and thus causes a decrease in yield of the product.

The inventor has isolated various kinds of thioalcohols from cracked oil and manufactured various kinds of disulphides therefrom, and then studied their reactions with various kinds of metals and metallic salts of organic and inorganic acids, and studied their various properties including solubility, stability, etc. Also, he has studied the ease and speed of formation of metallic salts from the solutions of thioalcohols and disulphides in petroleum hydrocarbons, and studied the behavior of these salts in petroleum hydrocarbons. Thus, by applying the results of these studies to cracked oil, he has ascertained the most favorable conditions, with regard to the refining of cracked oil, and his discovery is as follows:

1. One or mixture of copper, lead, zinc and iron salts of fatty acids, such as oleic acid, are easily soluble in gasoline, petroleum oil, benzol, toluol, xylols, turpentine, etc., and when kept as concentrated solutions, same do not change their qualities.

2. If a solution of metallic salts of these organic acids is added to gasoline or petroleum oils containing thioalcohols, same disperses throughout the latter spontaneously, mixes with it and reacts with the thioalcohols by double decomposition even at the ordinary room temperatures or below such temperatures, thereby, depositing metallic salts of thioalcohols. Thus, in this manner it is possible to remove said thioalcohols completely from the oil.

As to the reactions taking place in this process, the inventor has studied same fully with regard to oleic acid. It is illustrated by the following equation of the reaction of propyl thioalcohol with oleic soap:

(I) $2C_3H_7SH + Cu(C_{18}H_{33}O_2)_2 = Cu(SC_3H_7)_2 + 2C_{18}H_{34}O_2$

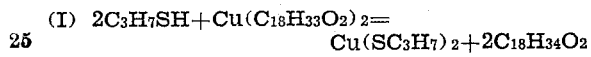

$Cu(SC_3H_7)_2$ produced here is also converted into disulphide and cupric salt of propyl thioalcohol as soon as it is produced.

(II) $4Cu(SC_3H_7)_2 = 2CuSC_3H_7 + (C_3H_7S)_2$

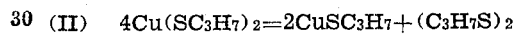

3. Disulphide produced here is mostly adsorbed into a metallic salt of thioalcohol the instant it is produced and is deposited with the salt if the product is allowed to settle spontaneously without stirring, and presents the same appearance as if this refining reaction had occurred according to the Equation I alone.

4. It is necessary that the reaction between the metallic salt of organic acid and the thioalcohol should proceed slowly. Thus, after the completion of the reaction and after deposition of metallic salt of thioalcohol and disulphide, the supernatant oil should be filtered gently through a filter bed of fuller's earth, and thus these offensive odor substances may be completely separated from the oil to be purified.

5. The refined cracked oil may be subjected to steam distillation directly. After the gasoline fraction is distilled, the residual oil is stirred with an alkali solution, and thus the fatty acid may be recovered as alkali soap from the oil.

When the result of the above study was applied to the refining of cracked oil, it was possible to produce cracked gasoline entirely free from thioalcohols and the offensive odor caused by the disulfides.

The following are a few examples of refining of cracked oil for the preparation of cracked gasoline:

Add 0.5% (by volume) of 20% caustic soda solution to 100 kilolitres of the cracked oil produced from Dubb's cracking plant and agitate it to remove sulphuretted hydrogen, organic acids and other reactive substances from the cracked oil. This pre-treatment minimizes the amount of metallic salt of organic acid required. Next, after washing with enough water to completely remove any alkali-residue, dehydrate same. Then, add a clear extract solution, of copper oleate in gasoline, which is prepared by settling and filtering a solution of 200 kilograms of copper oleate in 500 litres of gasoline, to the above cracked oil purified by alkali solution and leave the mixture for 8 to 12 hours in order to precipitate the insoluble salts produced, after which the supernatant oil is filtered through a filter bed of fuller's earth. Next, subject the filtered oil to steam distillation in a steam still and distill off the gasoline fraction. Put the gasoline fraction in a continuous treating apparatus and wash it with sulphuric acid, alkali and water by turns. The finished gasoline thus produced has an excellent quality free from disagreeable odor.

Thus, it may be possible to obtain gasoline of superior quality which is not only free from disagreeable odor, but also has a very high stability.

The invention above stated has the following advantages:

1. As a refining agent is easily brought into very intimate contact with the substance to be refined, it can react with the whole of offensive odor compounds in the cracked oil.

2. It is possible to not only remove the disulphides produced during reaction in the refining, but also to remove disulphides originally contained in the matter to be refined by astringent and adsorptive actions.

3. For the above reason, offensive odor substances can be removed completely from cracked oil.

4. As the matter to be purified is not stirred or agitated, it is possible to prevent the oxidation of any thioalcohols, and also vaporization losses of the volatile portion of the matter to be refined are minimized.

5. The recovery of the refining agent is simple.

We claim:

The method of refining cracked oil, which consists in dissolving oil-soluble heavy metallic soap of oleic acid in a volatile organic solvent which will disperse homogeneously in cracked oil; pouring the solution thus obtained slowly into cracked oil to effect dispersion naturally and homogeneously at room temperature in the cracked oil whereby same will react with the intermingling mercaptans and precipitate same by double decomposition as insoluble metallic salts; separating the precipitate; and distilling the remaining liquor to separate it from the organic solvent.

MASAKICHI MIZUTA.
TEIJI YOSHIMURA.